US007817293B2

(12) United States Patent  
Boyd et al.

(10) Patent No.: US 7,817,293 B2
(45) Date of Patent: Oct. 19, 2010

(54) TRACE AND DEBUG TOOL FOR HIGH SPEED PRINTER SYSTEMS (75) Inventors: Erin Ann Boyd, Longmont, CO (US); Allyn Hugh Nay, Lafayette, CO (US); Stephen Goddard Price, Longmont, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1687 days.

(21) Appl. No.: 11/031,750

(22) Filed: Jan. 7, 2005

(65) Prior Publication Data

US 2006/0152754 A1 Jul. 13, 2006

(51) Int. Cl.
G06F 3/12 (2006.01)
(52) U.S. Cl. .................. 358/1.15; 717/128; 714/25; 714/44; 714/45; 714/46
(58) Field of Classification Search .............. 714/25, 714/44, 45, 46; 717/128; 358/1.15
See application file for complete search history.

(56) References Cited

U.S. PATENT DOCUMENTS

| 5,535,310 | A | * | 7/1996 | Michel .................. 358/1.14 |
| 5,828,863 | A | | 10/1998 | Barrett et al. |
| 5,943,498 | A | | 8/1999 | Yano et al. |
| 6,058,393 | A | | 5/2000 | Meier et al. |
| 6,083,281 | A | * | 7/2000 | Diec et al. .................. 717/128 |
| 6,105,059 | A | | 8/2000 | Al-Karmi et al. |
| 6,134,676 | A | | 10/2000 | VanHuben et al. |
| 6,161,216 | A | | 12/2000 | Shagam |
| 6,311,326 | B1 | * | 10/2001 | Shagam .................. 717/128 |
| 6,369,903 | B1 | | 4/2002 | Kim |
| 6,470,388 | B1 | * | 10/2002 | Niemi et al. .................. 709/224 |
| 6,529,856 | B1 | * | 3/2003 | Fischer et al. .................. 702/186 |
| 6,535,865 | B1 | * | 3/2003 | Skaaning et al. .................. 706/52 |
| 6,539,501 | B1 | | 3/2003 | Edwards |

(Continued)

FOREIGN PATENT DOCUMENTS

JP 2000284985 A 10/2000

OTHER PUBLICATIONS

Cianciosi et al., Interactive Alter/Display—Instruction Trace Programming Aid, IBM Technical Disclosure Bulletin, Aug. 1974, vol. 17, No. 8, pp. 734-738.

*Primary Examiner*—David K Moore
*Assistant Examiner*—Benjamin O Dulaney
(74) *Attorney, Agent, or Firm*—Duft Bornsen & Fishman, LLP (57) ABSTRACT A printer system stores a trace of a printer job in storage that is either local or accessible to the printer system. A remotely implemented tool accesses the stored printer job trace. The tool includes a graphical interface that displays the printer commands in the printer job trace in a human readable format. The commands may be displayed in a first window of the interface. In one embodiment, the interface includes a second window where details of a command selected or highlighted in the first window are displayed. The tool may be implemented as a secure web browser that requires password verification to access the printer job trace. The tool may include the ability to replace confidential print data with generic or non-confidential data. The tool might further be able to display text that is embedded in a printer job trace command in ASCII and EBCDIC format.

19 Claims, 4 Drawing Sheets

U.S. PATENT DOCUMENTS

| | | |
|---|---|---|
| 6,542,844 B1 | 4/2003 | Hanna |
| 6,687,856 B2 | 2/2004 | Jibbe |
| 7,010,593 B2 * | 3/2006 | Raymond .................. 709/224 |
| 7,058,928 B2 * | 6/2006 | Wygodny et al. ........... 717/128 |
| 7,168,003 B2 * | 1/2007 | Lozano et al. ............... 714/25 |
| 7,191,368 B1 * | 3/2007 | Organ et al. ................. 714/57 |
| 7,200,588 B1 * | 4/2007 | Srivastava et al. .............. 707/3 |
| 7,506,315 B1 * | 3/2009 | Kabadiyski et al. ......... 717/128 |
| 2002/0095660 A1 * | 7/2002 | O'Brien et al. ............. 717/127 |
| 2002/0191020 A1 * | 12/2002 | Kaply et al. ................ 345/764 |
| 2003/0077097 A1 * | 4/2003 | Parry .......................... 400/74 |
| 2003/0112452 A1 | 6/2003 | McIntyre |
| 2003/0156874 A1 * | 8/2003 | Parry .......................... 400/74 |
| 2004/0002903 A1 * | 1/2004 | Stolfo et al. ................. 705/26 |
| 2004/0080767 A1 * | 4/2004 | Meilstrup et al. ......... 358/1.13 |
| 2004/0153863 A1 * | 8/2004 | Klotz et al. .................... 714/45 |
| 2007/0277057 A1 * | 11/2007 | Braun ........................ 714/44 |

* cited by examiner

TRACE AND DEBUG TOOL FOR HIGH SPEED PRINTER SYSTEMS

BACKGROUND

1. Field of the Present Invention

The present invention is in the field of printer systems and, more particularly, methods and techniques for debugging printer system problems.

2. History of Related Art

In the field of high-speed printer systems, debugging most field problems generally requires the use of a customer service engineer. The engineer would generally travel to the customer's site to obtain a trace of the printer job that produces a particular problem. There are several drawbacks to this method of performing analysis and debug of a printer system.

It is generally slow and expensive to send an engineer to the site of every customer with a printer system problem. Moreover, the techniques employed by customer service engineers to obtain printer job traces have multiple problems.

Host traces and sniffer traces are generally very large. Moreover, recreating a printer job from a host trace or sniffer trace requires significant personnel resources. In conventional approaches to debugging printer systems, printer job data was captured on a laptop computer connected to the printer system via serial cable. Other approaches have employed specially built hardware to capture printer job data to a floppy disk. This data was then sent to a simulator that partially mimicked the printer behavior.

The existing techniques for capturing and analyzing printer jobs are insufficient. The printer simulators are generally unable to perform fully all of the functions of the printer system such as finishing operations, duplexing, and the like. In addition, capturing printer job traces out of a serial port requires a modification of printer microcode that could cause an alteration in the printer behavior. The use of a serial port to transmit large amounts of data can have a significant impact on the performance of the printer system and possibly alter the print and network environment with a possible loss of data. Significantly, a real printer cannot execute the printer trace obtained in this manner. In addition, the printer job trace generally has sensitive or confidential information that is not germane to the printer problem under analysis and which the customer is not anxious to divulge.

SUMMARY OF THE INVENTION

The problems identified above are addressed by an invention, which may implement as computer software or a service for debugging and analyzing a printer system. The printer system is enabled to store a trace of a printer job in storage that is either local or accessible to the printer system. A tool is provided that is able to access remotely the stored printer job trace. The tool includes a graphical interface for displaying commands in the printer job trace. The commands are displayed in a first window of the interface. In one embodiment, the interface includes a second window where details of a command selected or highlighted in the first window are displayed in a second window of the interface. The tool may be implemented as a secure web browser that requires password verification to access the printer job trace.

The tool may include features such as a feature to replace confidential print data with generic or non-confidential data. The tool might further be able to display text that is embedded in a printer job trace command in ASCII and EBCDIC format. Another feature of the tool may enable the tool to display on a display screen a print output associated with the printer job. Another feature of the tool may enable the user to edit a command in the stored trace and save the edited file back to disk (or other storage) for subsequent execution or simulation.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking the present invention is concerned with analyzing and debugging high-speed printer systems. A printer system is configured to store a trace of a printer job. The printer job trace is stored in storage that is local or accessible to the printer system. A tool enables a remote user to access the stored printer job trace and view the commands that are in the printer job trace with a graphical interface. The tool may include additional features that enable the user to filter or block customer-confidential information (e.g., text or images) in the printer job trace. The user may also be able to view text embedded in the printer job trace in various formats such as ASCII or EBCDIC. The tool may permit the user to edit commands in the printer job trace, save the edit file back as a binary or executable file, and transmit the edited binary file to a remote printer (e.g., the printer that generated the original job trace) for execution. Another feature of the invention permits the user to "print" the job corresponding to a printer job trace to a display screen.

Figure 1:
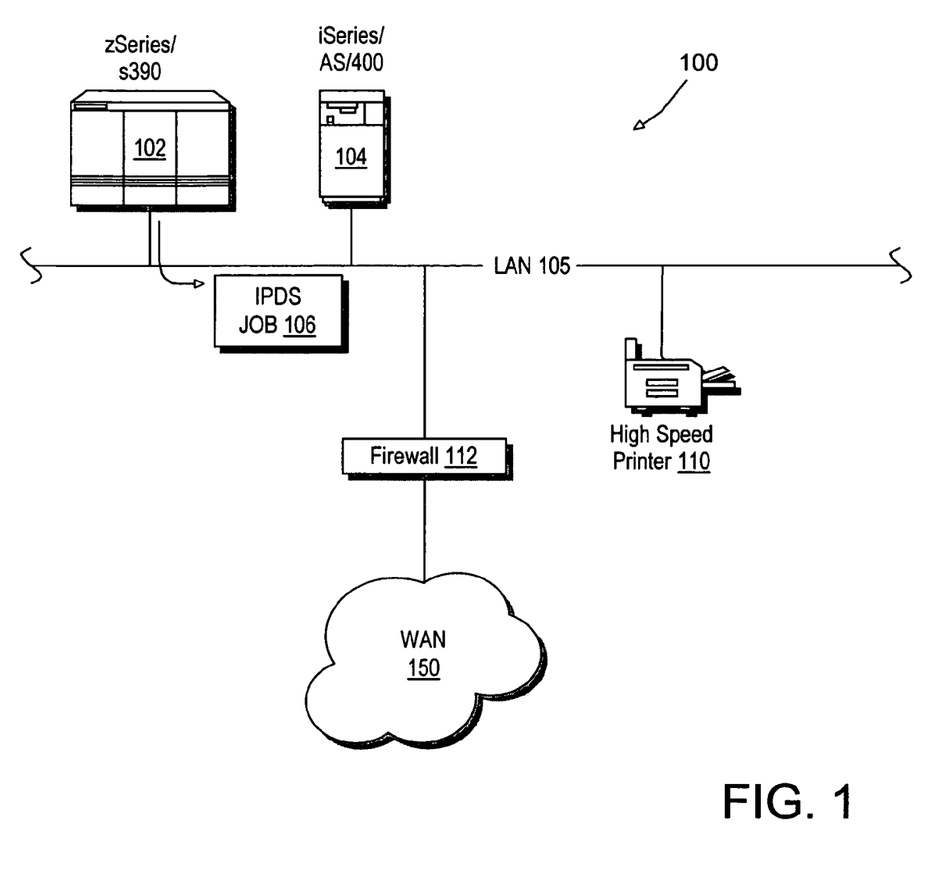
FIG. 1 is a block diagram of a printer system network including a printer system according to one embodiment of the invention.

Referring now to the drawings, FIG. 1 is a simplified block diagram of a data processing network 100 that includes a high-speed printer 110 according to one embodiment of the invention. In the depicted embodiment, high-speed printer 110 is connected to a LAN 105. LAN 105 is preferably an Ethernet or other form of LAN on which a networking protocol such as TCP/IP may be implemented. LAN 105, as shown in FIG. 1 is connected to a wide area network (WAN) 150, such as the Internet, through a firewall 112.

Various data processing systems are connected to LAN 105 and have network access to high-speed printer 110 as a resource. In the depicted embodiment, the data processing systems include a first system 102 representing a mainframe system such as an S/390 enterprise server and a midrange server 104 such as an AS/400e server, both from IBM Corporation. In the depicted implementation, first system 102 and second system 104 have access to high-speed printer 110. High-speed printer 110 includes many of the elements found in a midrange, cutsheet production printer such as the Infoprint family of printers from IBM Corporation.

As depicted in FIG. 1 data processing systems 102 and 104 send print jobs to high-speed printer 110 over LAN 105. FIG. 1, for example, depicts first data processing system 102 sending a print job to high-speed printer 110 over LAN 105. The print job, indicated by reference numeral 106, is an IPDS (Intelligent Printer Data Stream) compliant printer job. IPDS provides an interface for identifying, monitoring, and controlling all-points-addressable (APA) printers such as high-speed printer 110. IPDS facilitates the presentation of pages with combinations of various data types including text, vector graphics, images, and bar codes as well as the merging of different data types, often produced by independent applications, at print time. IPDS also supports two-way printer communication that enables detailed exception reporting and allows IPDS to adapt to specific printer resources and to deal with errors in real time.

Figure 2:
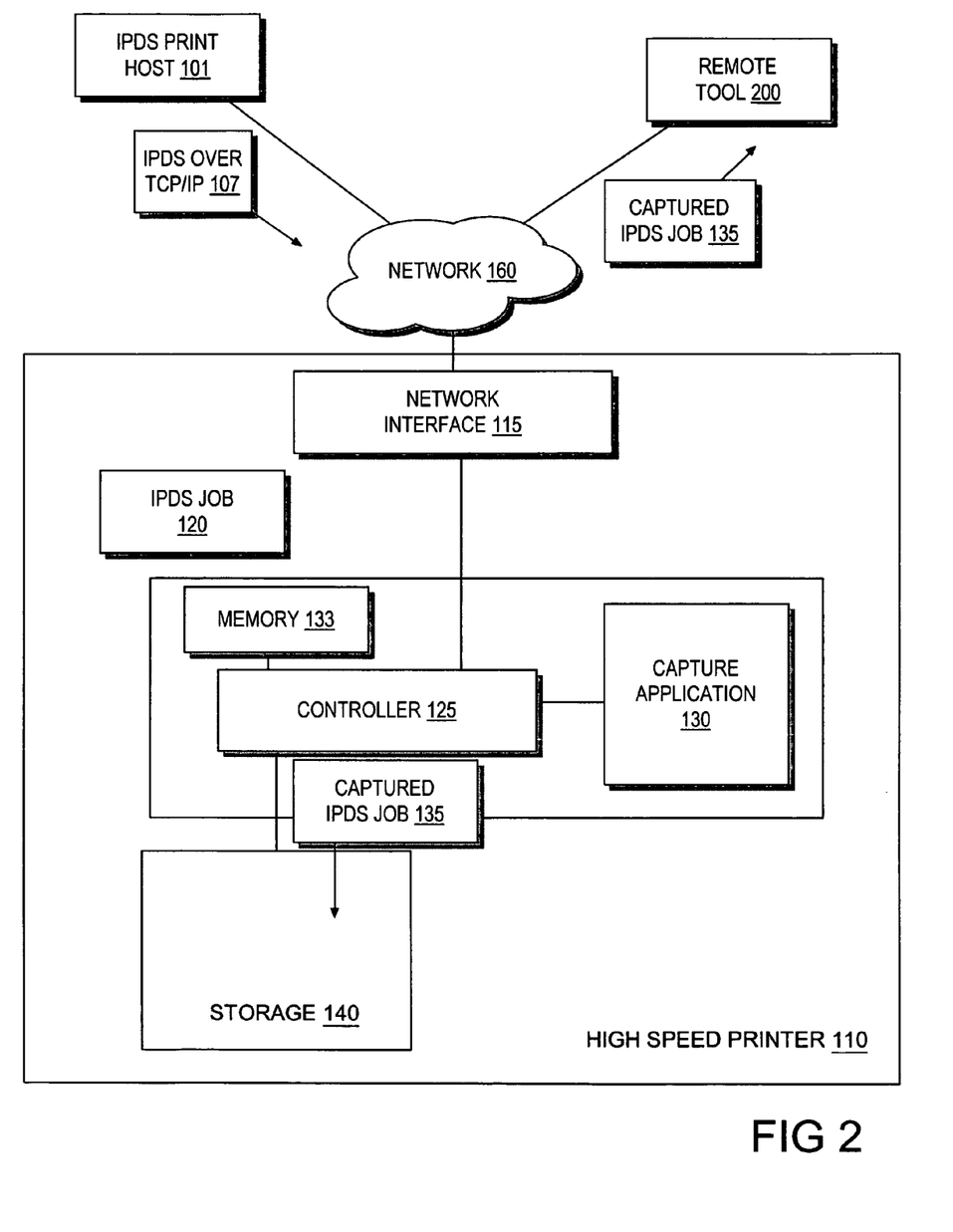
FIG. 2 is a block diagram of selected elements of a printer system according to one embodiment of the invention.

Referring now to FIG. 2, selected elements of high-speed printer 110 according to one embodiment of the present invention are illustrated. In the depicted implementation, high-speed printer 110 includes a network interface 115 that couples the printer to a network 160, which may include both the LAN 105 and the WAN 150 of FIG. 1. In addition, FIG. 2 represents any print host data processing system (such as systems 102 or 104 of FIG. 1) generically as IPDS print host 101.

Network interface 115 includes the hardware, software, and firmware required to convert data such as an IPDS file into a network compliant packet or stream of packets. In the case of an Ethernet LAN, for example, network interface 115 includes a TCP/IP protocol processing stack that converts TCP/IP compliant packets on network 160 into application specific data that can be executed or interpreted by a controller 125 of printer 110. Likewise, network interface 115 converts data produced by controller 125 into network compliant packets for transmission over network 160.

The IPDS job 106 (FIG. 1) produced by data processing system 102 is sent over LAN 105 to high-speed printer 110 using conventional TCP/IP network addressing, transmission, and connection techniques. The IPDS job 106 of FIG. 1 is shown in FIG. 2 as IPDS over TCP/IP job 107 to emphasize the presence of network protocol layer data in job 107. Some conventional techniques for creating a trace of a printer job extract the data directly from the network link. In such implementations, the significant amount of protocol processing layers associated with a print job as it traverses the network represent a potentially large amount of data that is not needed or wanted for purposes of analyzing or debugging problems associated with high-speed printer 110.

The present invention beneficially creates traces of printer jobs after the job has been processed by the network interface 115 of high-speed printer 110. As depicted in FIG. 2, the IPDS over TCP/IP job 107 is received and processed by network interface 115 of high-speed printer 110. The network processing removes the network protocol layers (sometimes referred to as headers) of the IPDS job to produce an internal IPDS job 120. As such, the internal IPDS job 120 preferably consists of IPDS commands only and does not contain any network protocol layering. It will be appreciated, therefore, that IPDS job 120 is smaller (in terms of bytes) than IPDS over TCP/IP job 107 and is independent of the implementation of network 160.

Controller 125 may be implemented as a general-purpose microprocessor such as a PowerPC family processor from IBM Corporation. In other embodiments, controller 125 may be implemented as a special purpose or embedded controller. High-speed printer 110 includes a facility identified as capture application 130. Capture application 130 is preferably implemented as a set or sequence of instructions executable by controller 125. In this embodiment, the instructions of capture application 130 are stored on or in a computer readable medium such as disk storage 140 associated with high-speed printer 110. The disk storage 140 may be internal to printer 110 or accessible to printer 110 through the network 160. During times when controller 125 is executing capture application 130, portions of capture application 130 may be stored in a volatile or "scratch" memory 133 that is accessible to controller 125.

In the preferred embodiment, a user of high-speed printer 110 invokes capture application 130. Capture application 130, when invoked, preferably presents the user with an interface that enables the user to save or store a print job for subsequent analysis. The depicted embodiment of printer 110 includes a conceptual illustration of controller 125 executing capture application 130 to create an object identified as captured IPDS job trace 135. Controller 125 stores the captured IPDS job trace 135 in storage 140. Although the depicted implementation uses IPDS formatted print jobs, other printing formats such as PCL or Postscript are well within the scope of the present invention.

FIG. 2 also depicts a remote tool 200 that connects to high-speed printer 110 through network 160. In one implementation, remote tool 200, as suggested by its name, is remote to high-speed printer 110 and connects to the printer through an intervening WAN such as WAN 150 shown in FIG. 1. (The firewalls 112 of FIG. 1 are not shown in FIG. 2 for the sake of improving clarity). Remote tool 200 is configured to access storage 140 associated with high-speed printer 110. Remote tool 200 communicates with high-speed printer 110 via the network interface 115. In the preferred embodiment, remote tool 200 is implemented as a secure web browser. The secure web browser permits its user to access the printer as just another resource on the WAN. In a TCP/IP implementation for example, high-speed printer 110 may be accessed by specifying the IP address of the high-speed printer according to well-known web browser techniques. Preferably, however, remote tool 200 is implemented as a secure web browser that supports password protected access to high-speed printer 110 generally and storage 140 and captured IPDS job trace 135 particularly.

Figure 3:
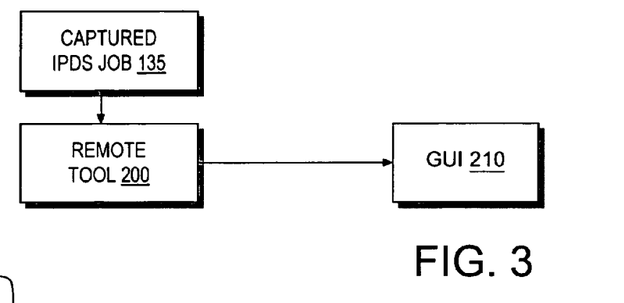
FIG. 3 is a block diagram of selected elements of selected elements of a remote tool for analyzing a printer system according to an embodiment of the invention.

As shown in FIG. 3, remote tool 200 retrieves IPDS job trace 135 and produces a graphical user interface (GUI) 210 to display the IPDS job trace 135. The IPDS job trace 135 may be stored within storage 140 as a binary or executable file. In this embodiment, remote tool 200 interprets the binary data in captured IPDS job trace 135 and produces human readable information from the binary file. Specifically, the binary data in IPDS job trace 135 represents a series of IPDS commands. Remote tool 200 is configured to interpret the IPDS commands and display the commands to the remote user via the graphical interface 210.

Figure 4:
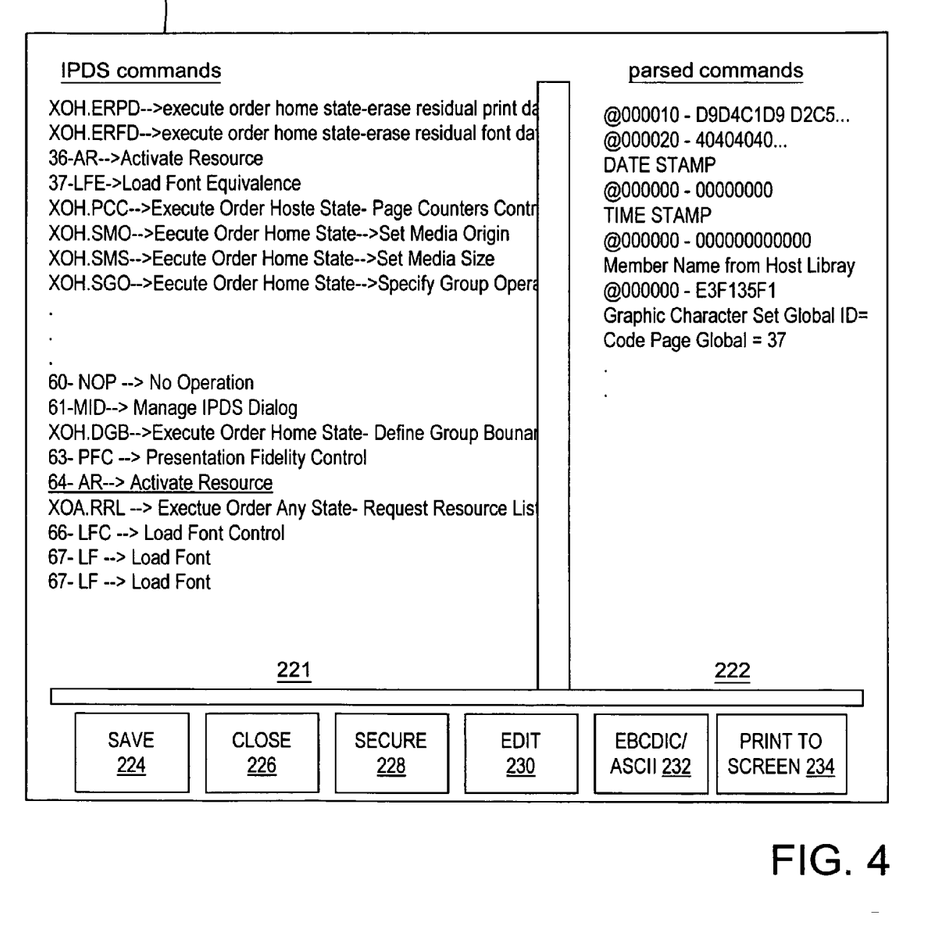
FIG. 4 is a representative display screen presented by a printer system analysis tool according to an embodiment of the invention.

Referring to FIG. 4, an exemplary representation of a graphic interface 210 according to one embodiment of the present invention is shown. In the depicted embodiment, graphical interface 210 is invoked from a location that is remote to the high-speed sprinter 110 (shown in FIG. 1) on which the printer job trace is stored. In an embodiment suitable for use with a high-speed printer 110 that is connected to a TCP/IP compliant LAN 105, graphical interface 210 is invoked as a web browser where the user retrieves the printer job trace by entering the IP address of the high-speed printer. In the preferred embodiment, graphical user interface 210 is part of a secure web browser that requires, among other things, password verification before enabling the user to access the printer job trace.

Graphical interface 210 as depicted in FIG. 4 includes a first window or pane 221 and a second window or pane 222. Graphical interface 210 is configured to display the printer commands that are in the printer job trace stored on the system. In an IPDS implementation, for example, graphical interface 210 displays the sequence of IPDS commands that are stored in the printer job trace. Graphical interface 210 interprets binary encoded IPDS commands in the printer job trace and displays a readable form of each interpreted command. First window 221 as depicted in FIG. 4 illustrates a sequence of exemplary IPDS commands that may be stored in any given printer job trace.

Graphical user interface 210 further displays a second window 222. In the embodiment depicted in FIG. 4, the second window 222 is used to display details of an IPDS command that is highlighted or otherwise selected in first window 221. In this embodiment, graphical interface 210 permits a user to select among the commands displayed in first window 221. When a user selects or highlights one of the IPDS commands in first window 221, the graphical interface parses the data associated with the highlighted command and displays details of the command in the second window 222. In the illustrated example, the ACTIVATE RESOURCE command in first window 221 is selected or highlighted (as indicated in FIG. 4 by the underlining). Upon selecting the ACTIVATE RESOURCE command, graphical interface 210 displays the details of the ACTIVATE RESOURCE command in second window 222. In the illustrated example, the details of a command selected in first window 221 may include information such as any date stamp and/or time stamp associated with the IPDS command, an indication of the member name from the host library, and so forth.

To support the functionality depicted in FIG. 4, graphical interface 210 and its associated web browser are configured to interpret binary encoded IPDS commands in the printer job trace stored on the printer. Other implementations may include support for other printer language options including PostScript and PCL. Graphical interface 210 enables the user, administrator, or technician to view specifics of a printer job that is causing problems for a customer. This ability is achieved in the preferred embodiment without requiring any additional hardware on the printer. Instead, the graphical interface 210 and the tool that supports the graphical interface leverage the existing network capabilities of the high-speed printer system.

In addition to the graphical interface windows 221 and 222, the depicted implementation of graphical interface 210 includes buttons 224 through 232, which provide additional and useful functionality. The SAVE button 224 enables the graphical interface user to save a printer job trace that is being displayed on the interface to storage that is local to the remote system on which graphical interface 210 is being displayed. The CLOSE button 226 enables the user to close the currently active printer job trace.

In the depicted embodiment, graphic interface 210 also includes a SECURE button 228. SECURE button 228, when activated, displays a secure or non-confidential form of the printer job trace. The printer job trace, in addition to including IPDS commands, also includes text and/or images that represent the data that is to be printed. This text and image data may be highly confidential to a customer experiencing a printer problem. While the customer desires to resolve the problem as quickly as possible, the customer is justifiably concerned about enabling a remote web browser to retrieve the printer job trace and the potentially confidential text and images that the printer job trace may include.

SECURE button 228 addresses this problem by providing a mechanism to convert confidential data in a printer job trace into generic or non-confidential information. In the case of text embedded in the printer job trace, for example, activating SECURE button 228 will convert text sequences within the printer job trace into generic text such as XXXXX. Similarly, image data present in the printer job trace may be displayed in graphical interface 210 as a black box or some other generic image. Having the ability to convert confidential information to a non-confidential form enables graphical interface 210 to provide its user with the basics of the printer job that is producing a problem without revealing data that, while most likely unrelated to the printer problem under analysis, is highly confidential to the customer. Thus, when SECURE button 228 is activated, graphical interface 210 displays text and images in the printer job trace as generic text and images.

Graphical interface 210 as depicted in FIG. 4 further includes an EDIT button 230 that enables the graphical interface user to edit command lines in first window 221 of graphic interface 210. Using EDIT button 230, the graphical interface user can perform basic editing functions such as deleting commands, inserting commands, and modifying existing commands. When the user edits a command in the first window 221, the user may also have the option of generating or modifying any data associated with that command by selecting the command and editing the corresponding second window 222. In the preferred embodiment, editing a command line in first window 221 may be followed by pressing the SAVE button 224, in which case graphical interface 210 saves a binary version of the edited printer job. This edited file may then be transmitted to the remote printer via the WAN and downloaded to the remote printer, which can then execute the job to determine if a bug has been fixed.

Graphical interface 210 further includes a text format button indicated as EBCDIC/ASCII button 232. Clicking on EBCDIC/ASCII button 232 toggles the graphical interface between an ASCII text mode in which text embedded in the printer job trace is interpreted by graphical interface 210 as ASCII text and an EBCDIC mode in which text embedded in the printer job trace is interpreted as EBCDIC text. The ability to toggle easily between these two basic text modes is important in environments where EBCDIC is a supported text format.

Graphical interface 210 may further include a PRINT TO SCREEN button 234. The PRINT TO SCREEN button 234, when activated, acts on the printer job trace that is currently active in graphical interface 210 and displays the output that would result if the active print job were delivered to and executed by the high-speed printer. As its name implies, the PRINT TO SCREEN button 234 directs its output to the display screen of the remote system on which the graphical interface 210 is executing.

Portions of the present invention may be implemented as a set of computer executable instructions (computer software code) stored in a computer readable medium such as a hard disk, floppy diskette, CD ROM, and so forth. In this embodiment, the computer code may include instruction sequences that when executed enable a user to analyze or debug a printer system. The instructions may enable the user to view in readable form instructions taken from a trace of a printer job. Such computer code is conceptually represented by a flow diagram of a method, where the method represents a sequence of actions that occur when the computer code is executed.

Figure 5:
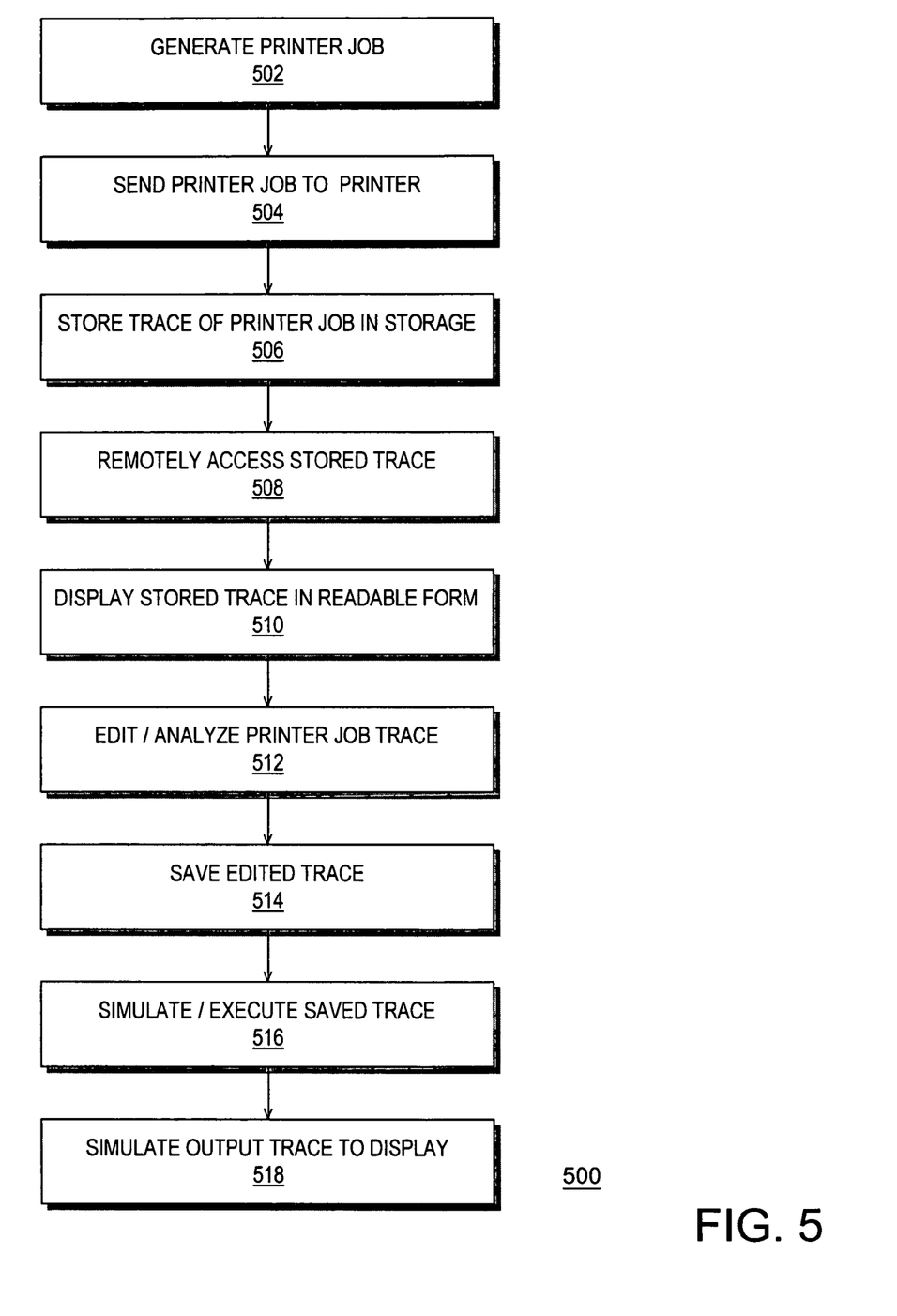
FIG. 5 is a flow diagram of a method of analyzing printer jobs produced by the printer system of FIG. 1.

Referring now to FIG. 5, a method 500 of analyzing a printer system is depicted according to one embodiment of the invention. Initially, a host machine generates (block 502) a printer job. In the data processing network of FIG. 1, for example, a printer job may be generated by a mainframe system 102 or a midrange server system 104. In either case, the printer job is formatted according to one embodiment, as an IPDS print job. The IPDS print job is then sent (block 504) to the printer system where the printer system is an IPDS compatible system. The printer system is configured to store (block 506) a trace of the print job in local storage or storage that is otherwise accessible to the printer. The print job trace is preferably a binary encoded file that contains only printer commands and their associated data. The print job trace preferably does not include network protocol layering or any other data that is not directly interpreted by the printer system on which the print job executes.

After the print job trace is stored, the stored trace is then accessed (block 508). In the preferred embodiment, the print job trace is accessed from a remote user of a secure web browser. The web browser enables the user to specify an IP address of the storage facility where the printer job trace is stored. The web browser further includes computer code for displaying (block 510) the instructions in the stored trace in a human readable form in a graphical display on a remote machine.

The user of the graphical interface may then view, analyze, and/or edit (block 512) the active print job (i.e., the print job being displayed by the graphical interface). In the preferred embodiment, the graphical interface includes a first window for displaying the printer commands and a second window that displays or parses a selected instruction from the first window. After viewing and/or editing the printer job trace, the graphical interface enables the user to save the trace (block 514) locally. The trace saved by the graphical interface is preferably a binary file that may be executed by the printer system.

The graphical interface may further include computer code enabling the interface to simulate (block 516) the printer system so that the saved trace can be tested locally. In addition, the graphical interface may include the ability to display (block 518) the results of the simulation/execution within the graphical interface.

It will be apparent to those skilled in the art having the benefit of this disclosure that the present invention contemplates a mechanism for analyzing printer systems and print jobs executing on those systems. By enabling a customer to save a printer job trace locally and have a customer service representative access the printer job trace from a remote location, the present invention beneficially reduces the amount of time and effort needed to analyze printer system problems. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A non-transitory computer readable medium storing a computer program product, said computer program product comprising a set of computer executable instructions for debugging and analyzing a printer system, comprising:

computer code means for remotely accessing a printer job trace stored in storage associated with the printer;
computer code means for displaying a graphical interface;
computer code means for parsing commands in the printer job trace and displaying the parsed commands in a first window of the graphical interface; and
computer code means for editing a parsed command and storing an edited printer job trace, including the edited command, as a printer executable file.

2. The non-transitory computer readable medium of claim 1, wherein the computer code means for remotely accessing the printer job trace includes a web browser and further wherein the web browser requires password verification to the printer job trace.

3. The non-transitory computer readable medium of claim 1, further comprising computer code means for highlighting a command in the first window and computer code means for displaying details of the highlighted command in a second window of the graphical interface.

4. The non-transitory computer readable medium of claim 3, further comprising computer code means for replacing confidential data in the printer job trace with nonconfidential data.

5. The non-transitory computer readable medium of claim 3, further comprising computer code means for displaying embedded text in the highlighted command in a format selected from the group consisting of ASCII and EBCDIC.

6. The non-transitory computer readable medium of claim 1, further comprising computer code means for displaying a print output associated with the printer job trace in a second window of the graphical interface.

7. The non-transitory computer readable medium of claim 1, wherein the parsed commands in the first window comprise IPDS commands.

8. The non-transitory computer readable medium of claim 1, further comprising computer code means for executing the edited printer job on a remote printer.

9. A method of analyzing a printer system, wherein the method is operable within a computing system, the method comprising:

providing an application for capturing a trace of a printer job and storing the trace in storage; and
providing a tool for remotely retrieving the trace from the storage;
wherein the tool includes computer code means for parsing commands in the stored trace, displaying the parsed commands in a graphical interface, editing a parsed command, and storing an edited printer job trace, including the edited command, as a printer executable file.

10. The method of claim 9, wherein the tool includes a web browser for accessing the stored trace via a TCP/IP network to which the storage is connected and wherein access to the stored trace data is password protected.

11. The method of claim 9, wherein the tool includes code means for removing confidential data from the stored trace.

12. The method of claim 11, wherein the tool includes code means for replacing confidential text associated with the printer job with nonconfidential text and code means for replacing confidential images associated with the printer job with nonconfidential images.

13. The method of claim 9, wherein the graphical interface includes code means for displaying the parsed commands in a first window and a code means for displaying details of a highlighted command in the first window in a second window.

14. The method of claim 13, wherein the graphical interface includes code means for displaying text embedded in the highlighted command in a format selected from the group of formations consisting of EBCDIC or ASCII.

15. The method of claim 9, wherein the printer job trace is captured after network protocol processing by the printer system wherein the captured trace is free of network protocol processing data.

16. The method of claim 9, wherein the tool further includes means for displaying a print output associated with the printer job on the display screen.

17. A printer system, comprising:
a network interface connected to a wide area network;
a controller;
a capture application, executable by the controller, for storing a trace of a print job received by the printer;
means for enabling a remote web browser to access the stored trace of a print job; and
means for remotely editing a command of the accessed print job trace and storing an edited print job trace, including the edited command, as a printer executable file.

18. The printer system of claim 17, wherein the capture application generates a trace of the print job after the network interface has processed network protocol data associated with the print job wherein the stored print job is free of network protocol data.

19. The printer system of claim 17, further comprising means for receiving the printer executable file from a remote application and means for executing the received printer executable file on the printer.

* * * * *